US006099991A

United States Patent [19]

Inagaki et al.

[11] Patent Number: 6,099,991

[45] Date of Patent: Aug. 8, 2000

[54] ELECTRODE FOR ALKALINE STORAGE BATTERIES AND PROCESS FOR PRODUCING THE SAME

[75] Inventors: Toru Inagaki, Kamakura; Hiroki Takeshima, Fujisawa; Kazushige Sugimoto, Odawara; Hideo Kaiya, Chigasaki, all of Japan

[73] Assignee: Matsushita Electric Industrial Co., Ltd., Osaka, Japan

[21] Appl. No.: 09/044,091

[22] Filed: Mar. 19, 1998

[51] Int. Cl.$^{7}$ .............................. H01M 4/80; H01M 4/32; H01M 4/36

[52] U.S. Cl. .......................... 429/235; 429/236; 429/223; 429/221; 429/206

[58] Field of Search .................................... 429/221, 223, 429/235, 236

[56] References Cited

U.S. PATENT DOCUMENTS

| | | | |
|---|---|---|---|
| 4,251,603 | 2/1981 | Matsumoto et al. | 429/94 |
| 5,561,002 | 10/1996 | Sakamoto et al. | 429/235 |
| 5,563,765 | 10/1996 | Lian et al. | 361/503 |
| 5,840,444 | 11/1998 | Takashima et al. | 429/233 |

FOREIGN PATENT DOCUMENTS

| | | |
|---|---|---|
| 0858853 | 8/1998 | European Pat. Off. . |
| 0859419 | 8/1998 | European Pat. Off. . |
| 51-59348 | 5/1976 | Japan . |
| 55-97403 | 7/1980 | Japan . |
| 60-41426 | 9/1985 | Japan . |

OTHER PUBLICATIONS

European Search Report (Sep. 28, 1998).

*Primary Examiner*—Maria Nuzzolillo
*Assistant Examiner*—Angela Martin
*Attorney, Agent, or Firm*—Stevens, Davis, Miller & Mosher, L.L.P.

[57] ABSTRACT

An electrode excellent in high-rate discharge characteristics is provided by increasing the adhesive strength of the conductive core material to the sintered nickel porous body which form the sintered type substrate. The electrode of the present invention uses a sintered substrate containing a part wherein the diameter of the pores of the sintered nickel porous body becomes successively smaller from the joining interfaces of the conductive core material toward the outside surfaces of the substrate. The region wherein the diameter is greater than in other parts preferably ranges within about ⅕ of the substrate thickness starting from both surfaces of the core material toward the outside surfaces of the substrate.

11 Claims, 3 Drawing Sheets

2
X
1
3
1
a
2

ELECTRODE FOR ALKALINE STORAGE BATTERIES AND PROCESS FOR PRODUCING THE SAME

BACKGROUND OF THE INVENTION

1. Field of the Invention

The present invention relates to an electrode, particularly a sintered type electrode, for alkaline storage batteries and a process for producing the electrode.

2. Description of the Related Art

While alkaline storage batteries have been enlarging their market with increasing use of portable communication equipment, office automation appliances, power tools and the like, batteries with higher capacity and more enhanced performances are eagerly desired.

Electrodes used for alkaline storage batteries are roughly divided into two types according to the method of production thereof. A sintered type electrode is obtained by impregnating, electrically or chemically, with an active material a substrate obtained by coating a core material with a paste formed by kneading carbonylnickel powder and a binder, followed by sintering. A paste type electrode is obtained by filling or coating a paste containing an active material into or on a metallic porous body, such as formed metal and nickel nonwoven fabric, or a two-dimensional core material, such as punched metal and expanded metal. The sintered type electrode, as compared with the paste type electrode, is featured in that though it is lower in capacity owing to the low porosity of the substrate, it has better charge-discharge characteristics at a large electric current.

In the sintered type substrate, also, attempts have been made to increase the porosity of the substrate in order to meet the demand for higher capacity. However, the increase of porosity causes the problems of lowering of adhesion of the core material to the porous body, deformation of the substrate in the steps of active material impregnation, chemical transformation, etc., and falling off of the nickel porous body or the impregnated or filled active material from the substrate.

With the intention of improving the adhesion of the core material to the porous body, JP-A-51-59348 proposed a process which comprises plating nickel on an iron plate at a current density of 5–20 A/dm$^2$ to form coarse plating deposits on the iron plate surface, the adhering nickel powder to the core material obtained above, followed by sintering. JP-B-60-41426 proposed a process which comprises coating the core material with a slurry comprising a metal powder for sintering of an average particle diameter of 0.1 $\mu$m or less and an adhesive, followed by drying and sintering, and then coating the surface of the sintered layer obtained above with a slurry comprising a metal powder for sintering of an average particle diameter of 1.5–4.5 $\mu$m and an adhesive, followed by drying and sintering. JP-A-55-97403 disclosed a process which comprises preliminarily sintering a nickel fiber or nickel-plated metal fiber with a fiber diameter of 20 $\mu$m or less on a core material and then sintering nickel powder thereon.

The above-mentioned processes intend to improve the adhesion of the porous body to the core material by increasing the contact area of the two. However, in all of the processes, the core material and the porous body are merely in point contact, and no substantial improvement in adhesion can be observed.

SUMMARY OF THE INVENTION

The main objects of the present invention are, for solving the above-mentioned problems, to increase the adhesive strength between the core material and the sintered nickel porous body thereby to suppress the deformation of the electrode plate in the steps of impregnation of the active material, chemical transformation and construction of the battery assembly and the falling off of the active material from the substrate and to improve the discharge characteristics at a large electric current of a battery when the electrode is incorporated into the battery.

To solve the above-mentioned problems, the present invention features using a sintered type substrate which contains a part wherein the diameter of the skeleton forming the sintered nickel porous body becomes successively smaller from the joining interface of the electroconductive core material and the sintered nickel porous body toward the substrate surface.

Preferably in a region ranging within about ⅕ of the substrate thickness starting from both surfaces of the conductive core material toward the outsides, the diameter of the skeleton which forms the sintered nickel porous body becomes successively smaller from the joining interface of the conductive core material and the sintered nickel porous body toward the substrate surface.

Furthermore, the sintered type substrate is incorporated with at least one element selected from the group consisting of P, B, S, In and As, and the concentration of the at least one element at a point, in a region ranging within about ⅕ of the substrate thickness starting from the core material surface toward the both outsides, successively increases as the point goes nearer to the core material.

When nickel metal is incorporated with a small amount of P, B, S, In or As, the melting point of the resultant alloy is greatly lowered as compared with the melting point of 1452° C. of nickel metal alone. For example, the melting points of nickel alloys of the binary system are as follows: Ni—P: 880° C., Ni—B: 1140° C., Ni—S: 645° C., Ni—In: 908° C., Ni—As: 898° C. When a substrate is sintered at a temperature not lower than the melting point of these nickel alloys, the nickel alloy of the core material surface is melted and hence the joining interface of the core material and the nickel porous body is rapidly sintered. The melted nickel alloy is sucked into the pore of the nickel porous body from the core material surface toward the substrate surface by the capillary force. Therefore, when the alloy is cooled after sintering and is solidified again, a substrate of a configuration wherein the diameter of the nickel porous body skeleton successively decreases from the core material toward the substrate surface is obtained. The concentration of the nickel alloy decreases as the diameter of the porous body skeleton decreases.

In the neighborhood of the skeleton formed as the result of sintering of the melted nickel alloy with the nickel porous body, the nickel porous body tends to have a large core diameter. Therefore, even when the porous body is impregnated with an active material by electrical or chemical processes, sometimes the porous body cannot hold the active material securely. In order not to lower the amount of the active material filled into the substrate, the region wherein the nickel alloy is present is preferably within the range of about ⅕ of the substrate thickness starting from the core material surfaces toward the both outsides.

To obtain such a substrate configuration, the amount of at least one element selected from the group consisting of P, B, S, In and As added is preferably 0.02–0.2% by weight relative to the weight of the sintered type substrate. When the amount is less than 0.02% by weight the amount of melted alloy is too small, so that the nickel porous body is not smoothly sintered with the conductive core material, and the intended effect of improving the adhesion cannot be obtained. On the contrary, when the amount is more than 0.2% by weight the amount of the melted alloy is too large, so that the joining interface with the core material is excessively melted and the sintered nickel porous body cannot maintain its configuration. Resultantly, the porosity as the substrate diminishes and the amount of the active material which can be filled decreases.

In the previous sintered type substrate, core materials provided with openings, such as punched metals, have been used to suppress the peeling of the sintered nickel porous body from the core material. According to the present invention, however, the band strength between the nickel porous body and the core material is greatly improved, so that, besides perforated sheets such as punched metals, plate or sheets having no opening can be used as the core material.

The sintered type substrate according to the present invention may be produced, for example, as follows. On the surface of a nickel plate or a nickel-coated iron plate is coated an alloy of nickel with at least one element selected from the group consisting of P, B, S, in and As by means of plating, preferably by means of electroplating. Then the resulting conductive core material is coated on the both surfaces with a slurry comprising nickel powder and a binder, and then sintered at a temperature not lower than the melting point of the nickel alloy, to obtain a sintered type substrate.

In another production process, the surface of a nickel plate or a nickel-coated iron plate is coated with an alloy of nickel with P or B or both by means of electroless plating. Then the resulting conductive core material is coated on the both surfaces with a slurry comprising nickel powder and a binder, and then sintered at a temperature not lower than the melting point of the nickel alloy, to obtain a sintered type substrate.

DESCRIPTION OF THE PREFERRED EMBODIMENTS

Figure 1:
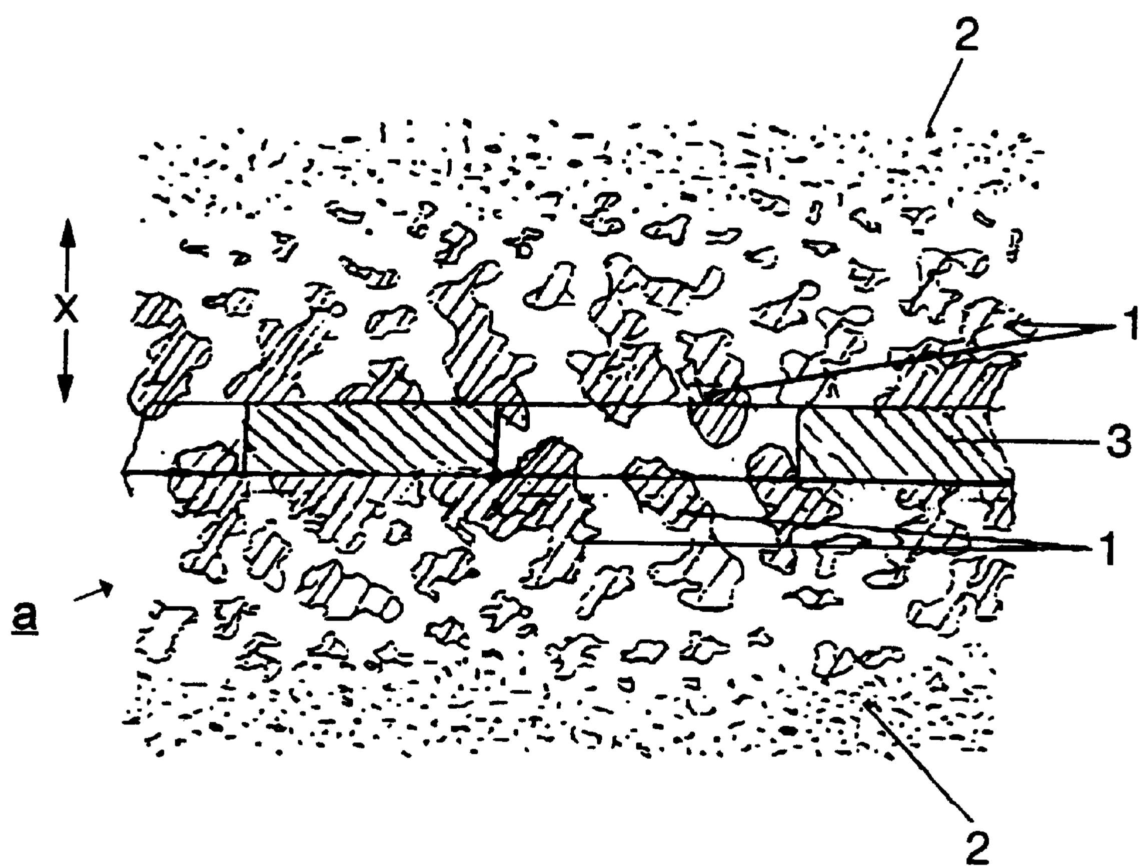
FIG. 1 is a sectional schematic view of an electrode substrate in one Example of the present invention.

One aspect of the present invention specifies an electrode for alkaline storage batteries which uses a sintered type substrate which contains a part wherein the diameter of the skeleton forming the sintered nickel porous body is successively smaller from the joining interface of the electroconductive core material and the sintered nickel porous body toward the substrate surface.

Another aspect of the present intention also specifies an electrode for alkaline storage batteries, according to which, in a region ranging within about ⅕ of the substrate thickness starting from the conductive pore material surfaces toward the both outsides, the diameter of the skeleton which forms the sintered nickel porous body becomes successively smaller from the joining interface of the conductive core material and the nickel porous body toward the substrate surface.

Additional aspects of the present invention specify an electrode for alkaline storage batteries. It is an electrode comprising a sintered type substrate formed essentially of a conductive core material disposed at the central part of the substrate and a sintered nickel porous body and an active material filled into the substrate wherein at least one element selected from the group consisting of P, B, S, In and As is made to exist in the joining interfacial part of the conductive core material and the sintered nickel porous body or, in a region ranging within about ⅕ of the substrate thickness from the core material surface of the joining part toward the both outsides, the content of at least one element selected from the group consisting of P, B, S, In and As at a point is made to increase successively as the point goes nearer to the conductive core material.

Further aspects of the present invention specify a process for producing an electrode for alkaline storage batteries.

The sintered type substrate used in the electrode for alkaline storage batteries of the present invention has a much larger contact area between the core material and the sintered nickel porous body as compared with prior sintered type substrates. Accordingly, the deformation of the substrate and the falling off of the active material from the substrate at the steps of impregnation of the active material, chemical transformation and construction of the battery assembly are suppressed and, when the substrate is incorporated into a battery, the high-rate discharge characteristics of the battery are improved.

The present invention is described below with reference to Examples and other details.

EXAMPLES

Example 1

A conductive core material was prepared by plating nickel in a thickness of 3.0 μm on both surfaces of a perforated iron plate having a thickness of 60 μm, opening diameter of 1 mm and opening ratio of 18%, and then coating a nickel-phosphorus alloy in a thickness of 1.0 μm on both surfaces of the nickel-plated plate by means of electroless plating.

The nickel-phosphorus alloy plating was conducted under the conditions of a bath composition of 25 g/l of nickel sulfate hexahydrate, 50 g/l of sodium pyrophosphate, 25 g/l of sodium hypophosphite monohydrate and 50 g/l of ammonium hydroxide, a pH of 10–11 and a bath temperature of 65–75° C. The alloy had a composition of 92% by weight of nickel and 8% by weight of phosphorous.

The core material was coated on both surfaces thereof with a slurry obtained by kneading 100 parts of a carbonylnickel powder (Type 255, mfd. by INCO Corp.) having an average particle diameter of 2–3 μm and 100 parts of an aqueous 3% by weight methylcellulose solution as a binder, so as to give a total thickness of 1.3 mm, then dried at 100° C. for 10 minutes, and sintered in a nitrogen-hydrogen atmosphere at 900° C. for 5 minutes, to obtain a sintered type substrate a. The content of phosphorus was 0.1% by weight based on the weight of the sintered type substrate.

The enlarged schematic view of the section of the substrate a is shown in FIG. 1. In FIG. 1, 1 is a part wherein the nickel-phosphorus alloy has been melted and sintered, 2 is the sintered nickel porous body and 3 is the perforated iron plate constituting the core material . In FIG. 1, the thickness X was about ⅛ of the substrate thickness.

The substrate a obtained above was dipped in an aqueous nickel nitrate-cobalt nitrate solution wherein cobalt nitrate has been added in a volume ratio of 2% relative to nickel nitrate (pH: 2.0, solution temperature: 80° C.) for 10 minutes, then dried at 100° C. for 10 minutes and dipped in an aqueous sodium hydroxide solution (specific gravity: 1.2, solution temperature: 80° C.) for 20 minutes. This cycle was repeated 8 times to impregnate the substrate with nickel hydroxide of the active material. The nickel electrode thus obtained was cut into the size of a width of 35 mm and a length of 200 mm, and a lead plate was spot-welded to a part of the cut electrode, to obtain a nickel electrode 4. The nickel electrode 4 had a theoretical capacity of 1600 mAh.

Figure 2:
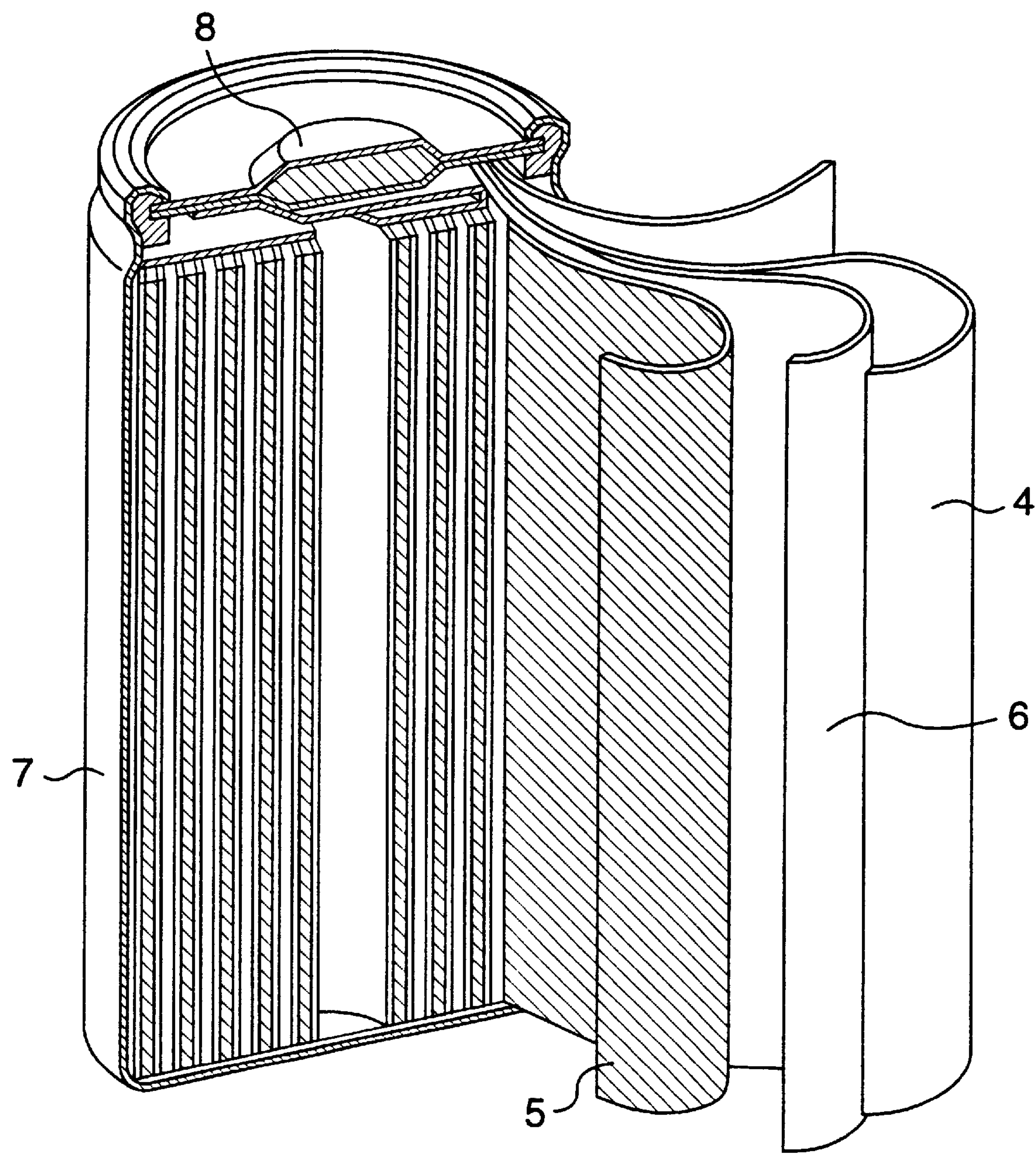
FIG. 2 is a schematic sectional view of a battery using the above-mentioned electrode substrate.

A cadmium electrode 5 was used as the negative electrode. A nylon nonwoven fabric separator 6 was interposed between the nickel electrode 4 and the cadmium electrode 5, and the whole was spirally wound and placed in a sub-C size battery case 7. Then a predetermined amount of an alkaline electrolyte obtained by dissolving 30 g/l of lithium hydroxide in an aqueous potassium hydroxide solution of a specific gravity of 1.30 was poured into the case and the case opening was sealed with a sealing plate 8 to which a positive electrode terminal had been fixed, to obtain an enclosed nickel-cadmium storage battery A shown in FIG. 2.

Example 2

Figure 3:
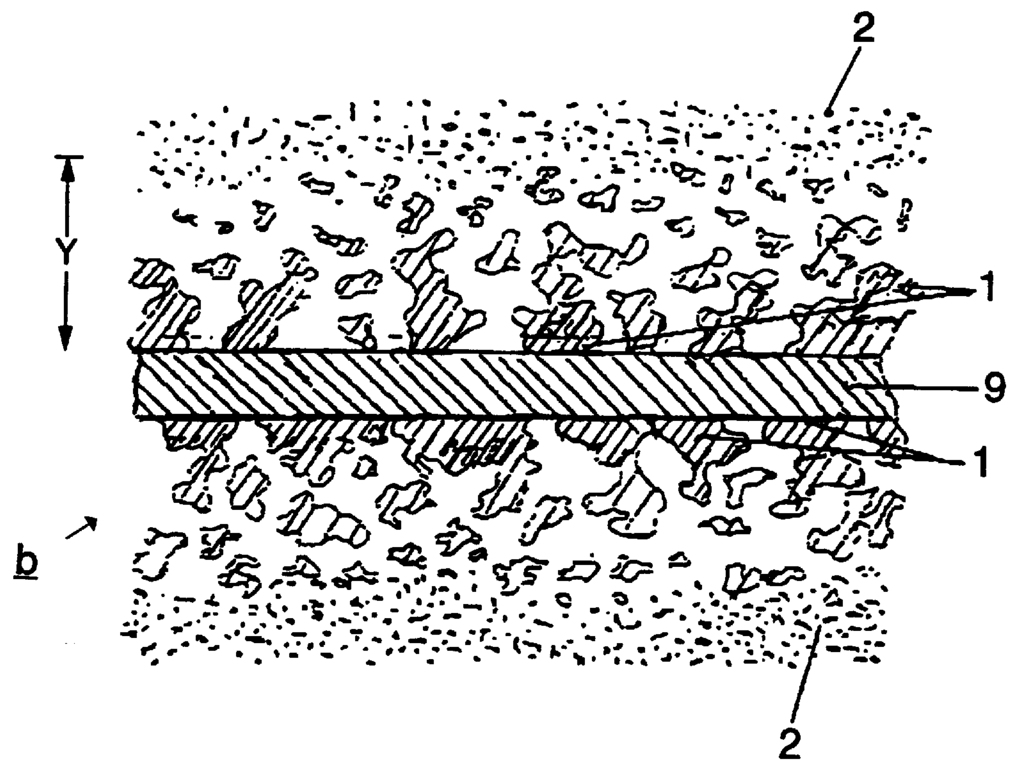
FIG. 3 is a sectional schematic view of an electrode substrate in another Examples of the present invention.

A conductive core material was prepared by plating nickel in a thickness of 3.0 μm on both surfaces of an iron plate having a thickness of 60 μm and then coating a nickel-phosphorus alloy in a thickness of 1.0 μm on both surfaces of the nickel-plated iron plate by means of electroless plating. The alloy had a composition of 92% by weight of nickel and 8% by weight of phosphorous. Then the core material was coated on both surfaces with a nickel slurry in the same manner as in Example 1, and then dried and sintered to obtain a sintered type substrate b. The content of phosphorus was 0.1% by weight based on the weight of the sintered type substrate. An enlarged schematic view of the section of the substrate b is shown in FIG. 3. In FIG. 3, the thickness Y was about ⅛ of the substrate thickness, and 9 is the iron plate constituting the conductive core material. A battery B was prepared by using the substrate b.

Though a method of preparation wherein phosphorus (P) was added to nickel by means of electroless plating was shown in the above Example, also when at least one element selected from the group consisting of P, B, S, In and As is added to nickel by other means, for example by electroplating, a similar substrate can be obtained so long as sintering is conducted at a temperature not lower than the melting point of the alloy.

As a Comparative Example, the following substrate and battery were prepared. First, a conductive core material was prepared by plating nickel in a thickness of 3.0 μm on the surface of a perforated iron plate having a thickness of 60 μm, opening diameter of 1 mm and opening ratio of 18%. Then, in the same manner: as in Example 1, the core material was coated on the both surfaces with a nickel slurry, then dried and sintered to obtain a sintered type substrate c, which was then used to prepare a battery C.

The substrates a, b and c obtained were subjected to the following tests to examine the adhesive strength of the core material to the nickel porous body.

Test 1

The substrates a, b and c were respectively cut into a size of 10×100 mm. Each of the resulting substrates was wound, with shifting, round iron wire having a diameter of 2 mm, which was separated 10 times. The ratio of decrease in weight after the test from the weight before the test was 0.05% in the substrate a, 0.07% in the substrate b and 10% in the substrate c. This result reveals that the substrates a and b had an improved adhesive strength of the core material to the nickel porous body as compared with the substrate c by virtue of the soldering effect of the nickel-phosphorus alloy.

Test 2

In a similar manner to the crosscut adhesion test, the substrates a, b and c were respectively cut into a size of 50×50 mm, and lattice-like cut lines were cut in a width of 2 mm into the nickel porous body of one side of each of the substrates cut above. In this operation no peeling of the nickel porous body was observed in any of the substrates a, b and c. Then, a gummed cloth tape was affixed to the substrate and then peeled off, which was repeated 3 times. The ratio of decrease in weight determined thereafter was 0.1% in the substrate a, 0.5% in the substrate b and 10% in the substrate c. This result also reveals that the substrates a and b had an improved adhesive strength of the core material to the nickel porous body as compared with the substrate c.

Figure 4:
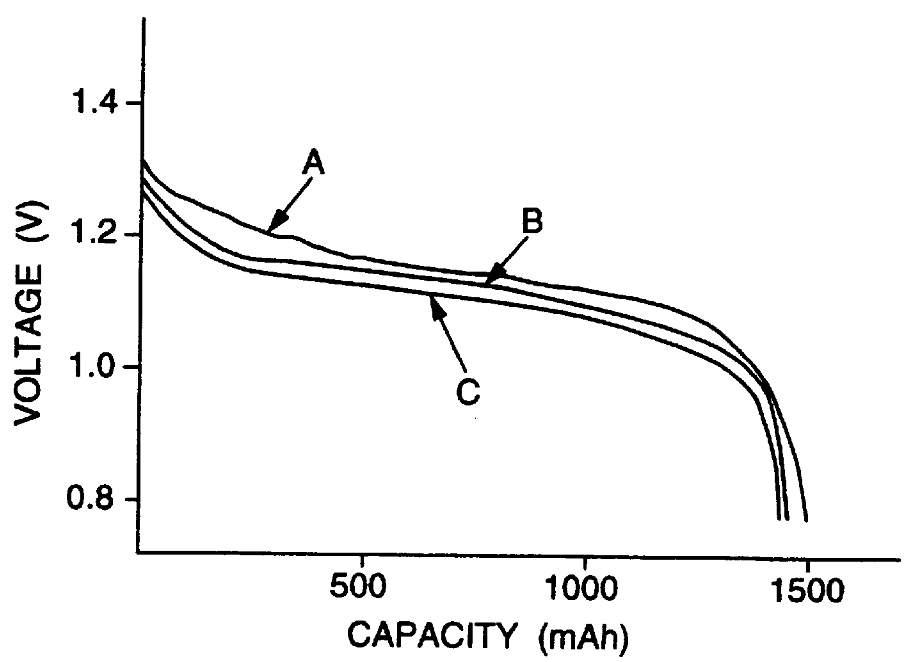
FIG. 4 is a graph showing the discharge curves of the above-mentioned batteries.

Then the batteries A, B and C were evaluated for their discharge characteristics. The batteries were charged at 1 CmA for 72 minutes and then discharged at 10 A until 0.8 V to obtain discharge curves, which are shown in FIG. 4. The results thus obtained reveal that the batteries A and B have an improved discharge characteristic when compared with battery C owing to the improvement of adhesion between the core material and nickel porous body. The battery B is somewhat poor in discharge characteristics as compared with the battery A because the former uses an iron plate having no opening as the conductive core material and hence the diffusion velocity of the electrolyte is relatively low.

According to the present invention, the adhesion of the conductive core material to the sintered nickel porous body is improved as compared with the previous sintered type substrate, whereby the strength of the substrate is increased, peeling of the sintered nickel porous body from the core material at the time of preparing the substrate is suppressed, and an electrode for alkaline storage batteries having excellent high-rate discharge characteristics is provided.

What is claimed is:

1. An electrode for alkaline storage batteries which comprises a sintered substrate consisting essentially of a porous body obtained by sintering nickel powder and a sheet-formed conductive core material having at least a first surface and a second surface disposed at the central part in a thickness direction of the porous body and an active material filled into the substrate, the sintered substrate containing a part wherein the diameter of the pores of the sintered nickel porous body becomes successively smaller from joining interfaces of the conductive core material and the nickel porous body toward outside surfaces of the substrate.

2. The electrode for alkaline storage batteries according to claim 1 wherein the sheet-formed conductive core material comprises at least one member selected from the group consisting of a metallic nickel plate, metallic nickel sheet, iron plate surface-coated with metallic nickel, iron sheet surface-coated with metallic nickel, and members obtained by perforating the above-mentioned plates and sheets.

3. An electrode for alkaline storage batteries which comprises a sintered substrate consisting essentially of a porous body obtained by sintering nickel powder and a sheet-formed conductive core material having at least a first surface and a second surface disposed at the central part in a thickness direction of the porous body and an active material filled into the substrate wherein, in a region ranging within about ⅕ of the thickness of the substrate measured from said first surface and said second surface, to outside surfaces of the substrate, the diameter of the pores of the sintered nickel porous body becomes successively smaller from joining interfaces of the conductive core material and the sintered nickel porous body toward said outside surfaces of said substrate.

4. The electrode for alkaline storage batteries according to claim 3 wherein the conductive core material comprises at least one member selected from the group consisting of a metallic nickel plate, a metallic nickel sheet, an iron plate surface-coated with metallic nickel, an iron sheet surface-coated with metallic nickel and members obtained by perforating the above-mentioned plates and sheets.

5. An electrode for alkaline storage batteries which comprises a sintered substrate consisting essentially of a porous body obtained by sintering nickel powder and a sheet-formed conductive core material having at least a first surface and a second surface disposed at the central part in a thickness direction of the porous body and an active material filled into the substrate, wherein a joining interfacial part of the conductive core material and the sintered nickel porous body contains at least one element selected from the group consisting of P, B, S, In and As.

6. The electrode for alkaline storage batteries according to claim 5 wherein the conductive core material comprises at least one member selected from the group consisting of a metallic nickel plate, a metallic nickel sheet, an iron plate surface-coated with metallic nickel, an iron sheet surface-coated with metallic nickel and members obtained by perforating the above-mentioned plates and sheets.

7. An electrode for alkaline storage batteries which comprises a sintered substrate consisting essentially of a porous body obtained by sintering nickel powder and a sheet-formed conductive core material having at least a first surface and a second surface disposed at the central part in a thickness direction of the porous body and an active material filled into the substrate, wherein the porous body, in a region ranging within about ⅕ of the thickness of the substrate measured from said first surface and said second surface to outside surfaces of the substrate, contains at least one element selected from the group consisting of P, B, S, In and As and the content of the at least one element decreases successively from joining interfaces of the core material and the nickel porous body to said outside surfaces of the substrate surface.

8. The electrode for alkaline storage batteries according to claim 7 wherein the amount of said at least one element selected from the group consisting of P, B, S, In and As is in the range of 0.02 to 0.2% by weight based on the weight of the sintered type substrate.

9. The electrode for alkaline storage batteries according to claim 7 wherein the conductive core material comprises at least one member selected from the group consisting of a metallic nickel plate, a metallic nickel sheet, an iron plate surface-coated with metallic nickel, an iron sheet surface-coated with metallic nickel and members obtained by perforating the above-mentioned plates and sheets.

10. A process for producing an electrode for alkaline storage batteries which comprises a sintered substrate consisting essentially of a porous body obtained by sintering nickel powder and a conductive core material having at least a first surface and a second surface disposed at the central part in a thickness direction of the porous body and an active material filled into the substrate, wherein the sintered substrate is obtained by a process comprising (a) coating the first surface and the second surface of the conductive core material with an alloy of nickel and at least one element selected from the group consisting of P, B, S, In and As by means of plating, (b) coating a first surface and a second surface of the alloy-coated conductive core material with a slurry comprising nickel powder and a binder, and (c) sintering the core material coated in steps (a) and (b) at a temperature not lower than the melting point of the alloy.

11. The process for producing an electrode for alkaline storage batteries according to claim 10 wherein step (a) comprises one of (i) coating the first surface and the second surface of the conductive core material with an alloy of nickel and at least one element selected from the group consisting of P, B, S, In and As by means of electroplating and (ii) coating the first surface and the second surface of the conductive core material with an alloy of nickel and at least one element selected from the group consisting of P and B by means of electroless plating.

* * * * *